July 20, 1943.                J. F. DAUKUS                2,324,913
                              CLUTCH PLATE
                           Filed Aug. 26, 1938

INVENTOR.
John F. Daukus
BY Ray, Oberlin & Ray
ATTORNEYS.

Patented July 20, 1943

2,324,913

UNITED STATES PATENT OFFICE 2,324,913

CLUTCH PLATE

John F. Daukus, Detroit, Mich.

Application August 26, 1938, Serial No. 226,924

23 Claims. (Cl. 192—107)

This invention relates to a friction clutch plate and more particularly to one adapted for automotive use. Clutches for this service which convey the rotative force of the motor to the rear axle assembly must be designed to function at relatively high speeds. The design of such a clutch plate involves important considerations of weight and strength, together with substantially complete contact between friction surfaces of the driving and driven plates.

Automotive clutches to meet present conditions of design should possess as low a polar moment of inertia as possible to maintain the "fly wheel" effect at a minimum. Referred to another way, the weight of the outer portion of the clutch plate should be as low as practical to reduce the spinning weight to a minimum. This is necessary to eliminate as much as possible the inertia effects which tend to retard the starting and stopping of the plate during the clutch operation.

A friction clutch should have some cushion to absorb the force of engagement of the parts and permit a relatively smooth connection in bringing the driving and driven parts to identical speeds. Such cushioning is frequently obtained by the interposition of spring members between the facing members. These spring or cushion members which directly back up the facing should be subject to deformation under a straight axial thrust so that when fully engaged the clutch should have substantially continuous contact between all parts of the driving and driven members.

Ideal cushion members should provide absolute uniformity of support over the entire area of the friction material so that the total supporting force would be slightly greater than the total clamping force provided in the clutch. At the same time the unit supporting force holding any small increment of friction facing in engagement should be sufficiently light so that no small area of the friction material will transmit more than its pro-rated share of the driving force and thereby cause instantaneous fluctuations of torque during the engagement of such a clutch mechanism.

Such an ideal cushioning mechanism can be most closely approached in practice by the use of very thin cushioning springs, crimped in some simple wave formation so as to provide a large number of very flexible support points to resiliently back up the friction material.

Plates have been made which are intended to be crimped to permit this flexibility, but they are of such formation that the metal is drawn, and not merely bent, and forms what in effect is a series of upstanding supports which are more rigid than flexible.

To provide a clutch plate as closely approaching the ideal as possible, I provide a substantially continuous annular ring of spring material which underlies the entire friction member. The cushion members are maintained in position and in driving relation with the central portion of the clutch plate by means of connecting arms, formed integrally with the cushion means. These arms are of the same thickness as the cushion means, but are reduced in area in a circumferential direction, thus making it possible for the cushion means to be crimped or bent without drawing the metal.

The general form of the wave so formed may be varied to coincide with the elements of a cone or a cylinder, or they may even be formed into alternate flats and slopes, the principal characteristic being that they are formed without drawing of the metal of which they are formed.

With the foregoing statements in mind it has been the object of my invention to design such a clutch which incorporates the feature of smooth engagement and a low spinning weight with decreased costs and increased ease of manufacture.

To the accomplishment of the foregoing and related ends, said invention, then, consists of the means hereinafter fully described and particularly pointed out in the claims; the annexed drawing and the following description setting forth in detail certain structure embodying the invention, such disclosed means constituting, however, but one of various structural forms in which the principle of the invention may be used.

Figure 1:
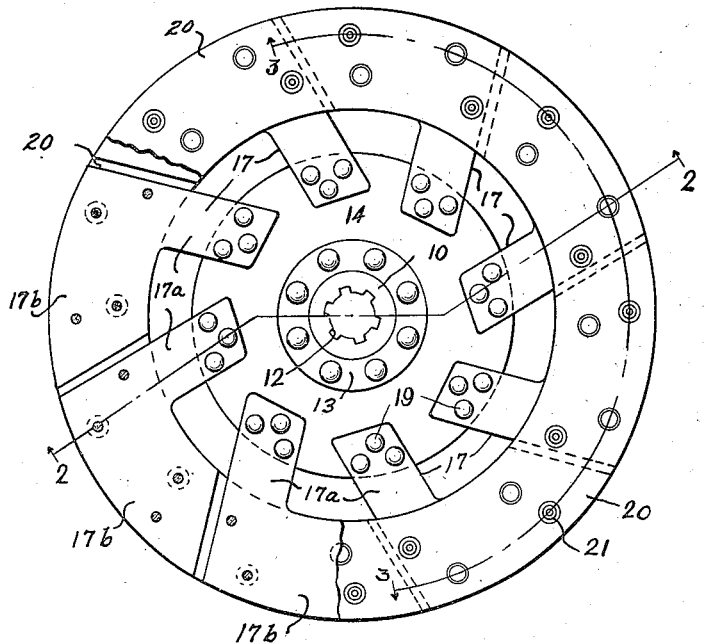
Fig. 1 is a plan view of my improved clutch plate.
Figure 2:
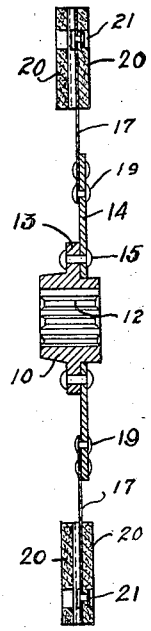
Fig. 2 is a transverse section through Fig. 1, as indicated by the line 2—2 thereon.

Referring now to Figs. 1 and 2, I provide a central hub 10 splined as at 12 to form a sliding fit with the drive shaft. The hub includes a flanged portion 13 extending radially therefrom and to which is secured the remainder of the plate.

An annular ring 14 is secured to the flange 13, either resiliently or fixedly as by rivets 15. This ring is made of ordinary high carbon steel. This member transmits the torque between the friction facings and the hub and is preferably made of hot rolled high carbon steel possessing as high a Rockwell hardness as will properly fabricate. I have found that in most cases, for best results, the thickness of the ring 14 should exceed .060 inch in the ordinary type of clutch.

Figure 3:
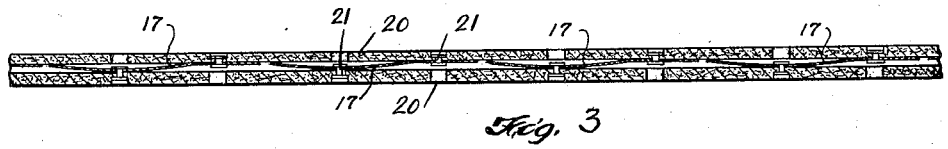
Fig. 3 is a development of the peripheral portion, as indicated by the line 3—3 on Fig. 1.
Figure 5:
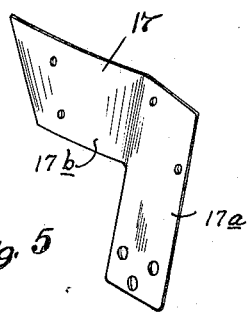
Fig. 5 is a perspective view of a section of the clutch plate.

L-shaped spring segments, best shown in Fig. 5 and indicated at 17, are riveted as at 19 to the ring 14. It will be apparent that a resilient connection, as is well known in the art, may be substituted for the rivets 19. Referring to Fig. 1, the members 17 cooperate with each other to form a relatively continuous ring spaced radially from the ring 14. It will be noted that, the direction of rotation in Fig. 1 being clockwise, the neck portions 17a of the sections 17 point away from the direction of rotation. The circumferentially extending wing portions 17b of the members 17 are each preferably formed with a single wave lying to one side of the general plane of the portions riveted to ring 14, as shown in Fig. 3, and friction facings 20 are riveted thereto as at 21, in spaced parallel relation to each other.

Cushioning action is provided between the friction faces due to the waved spring portions and is taken up by axial force exerted against the surfaces 20 upon engagement of the clutch. I have found that in modern high-speed engines the ordinary clutch plate possesses a high polar moment of inertia. The average driver today demands "fast get away," which means an automobile that will shift gears quickly and without clash. This in turn demands a clutch plate with minimum inertia. Since the polar moment of inertia involves the unit mass multiplied by the square of its polar radius, that is the radius from the center of rotation to the center of mass, it is important that the sections 17 be as light as possible. This is especially important because the diameter of the friction face may not be reduced below a certain satisfactory minimum, and to this extent the polar radii of the clutch plate are predetermined.

In ordinary automotive applications the sections 17 should be made of high grade spring material as thin as possible to reduce the polar moment of inertia and still maintain sufficient strength in the plate to transmit the driving torque of the engine. The thickness of this spring material will vary in different plates and under different conditions of installation. This great strength not only permits the use of relatively thin sections as far as carrying the driving torque is concerned, but it also provides a much more satisfactory cushion wave which will not readily take a set under load nor develop fatigue failure due to flexing in use.

Due to the improved qualities of this material more waves of a satisfactory flexibility can be placed around the circumference of any size plate. It is evident that the more waves available the less load each wave will be required to carry. I thus provide a cushion that is soft at any one point but which at the same time provides enough resistance to carry its full load. It is evident that the greater number of waves the more uniform the pressure will be distributed over the entire area of the facing.

Thus a spring section 17 formed in accord with the foregoing requirements not only possesses a low spinning weight, but permits effective cushion between the friction facings 20 of the assembly. I do not confine myself to the L-shaped sections shown, having found that for some uses a T-section may be employed or a U-section. In such case the leg of the T and the arms of the U are secured to the ring 14 in the manner of the neck portions 17a.

Figure 4:
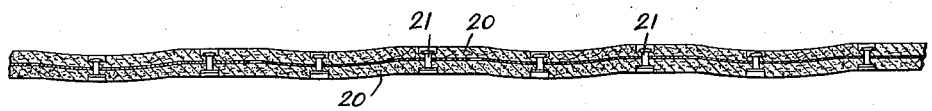
Fig. 4 is a similar section showing a modified form of construction.

A modified form of construction is shown in Fig. 4, in which the friction facings 20 are curved to initially conform to the curve or set in the sections 17. This is desirable where it is desired to flex the facings and the spring sections as a unit during engagement, which results in reenforcement of the steel spring sections.

From the foregoing description it will be apparent that I have invented a novel composite clutch plate. The wavy spring sections are formed along straight generally radial bend lines and hence the metal is only bent. As the cushion members 17 are attached to the ring 14 only at the inner ends of the reduced neck portions 17a there is no deformation of the metal as occurs in plates heretofore made where the wave was imparted by bending along curved lines, as distinguished from straight lines, with a resultant drawing effect on the metal. Thus the natural resiliency of the metal, particularly in the inwardly unconfined wing portions 17b, is free to absorb axial thrust and flatten out the plate when the same is engaged.

The use of a composite construction not only reduces the cost of the unit, but allows each of the component parts to be made of the type of material best suited for its needs.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a clutch plate construction, a hub, an intermediate member non-integral with said hub and secured thereto, a cushion member of thinner material than said intermediate member and carried thereby, said cushion member extending outwardly from said intermediate member and at its outer portion subtending a greater arcuate angle than is subtended by a portion of said cushion member between said intermediate member and said outer portion of said cushion member.

2. In a clutch plate assembly, a hub unit provided with an outwardly extending flange portion, an intermediate member secured to said flange portion, a cushion member of less thickness than said intermediate member carried by said intermediate member and extending outwardly therefrom, and a portion on said cushion member between the outer portion and said hub unit of less arcuate length than the said outer portion of said cushion member.

3. In a clutch plate assembly, a hub unit provided with an outwardly extending flange portion, an intermediate member secured to said flange portion, a cushion member of less thickness than said intermediate member carried by said intermediate member and extending outwardly therefrom, and a portion on said cushion member between the outer portion and said hub unit of less arcuate length than the said outer portion of said cushion member, a wave formed in the outer portion of said cushion member by bending of the material as distinguished from drawing, and friction facing secured to said outer portion.

4. In a clutch plate construction, a central hub, an intermediate member, a plurality of angularly formed sections of less thickness than said intermediate member and provided with necks overlying and secured to said intermediate member, the unsupported ends of said sections being materially wider than said necks and cooperating with each other to form a relatively continuous ring spaced outwardly from said intermediate member, and friction material secured to said cooperating sections.

5. In a clutch construction, a driven plate assembly comprising a hub, an intermediate member carried thereby, a series of cushion members carried by said intermediate member and extending outwardly therefrom in a generally radially flaring form, said cushion members formed of spring stock material thinner than said intermediate member, and unsupported portions of said cushion members cooperating to form a relatively continuous ring of wave formation susceptible of complete flattening while retaining its resilient characteristics.

6. In a clutch construction, a driven plate assembly, comprising a hub, an intermediate member carried thereby, a series of cushion members carried by said intermediate member and extending outwardly therefrom in a generally radially flaring form, said cushion members formed of spring stock material thinner than said intermediate member, and unsupported portions of said cushion members cooperating to form a relatively continuous ring of wave formation susceptible of complete flattening while retaining its resilient characteristics, and friction material secured to said members.

7. In a clutch plate construction, a central hub, an annular ring carried thereby, a plurality of angularly formed sections of less thickness than said ring and secured to said ring, said sections cooperating with each other to form a relatively continuous ring spaced outwardly from said first ring, and friction material secured to said cooperating sections.

8. In a clutch plate construction, a central hub, an annular ring carried thereby, a plurality of resilient sections of less thickness than said ring and secured to said ring, the ratio of thickness between said sections and said ring being less than 1 to 2, said spring sections cooperating with each other to form a relatively continuous ring spaced outwardly from said first ring, and friction material secured to said cooperating sections.

9. In a clutch plate construction, a central hub, an annular ring carried thereby a plurality of L-shaped sections of less thickness than said ring secured to said ring, said L-sections cooperating with each other to form a relatively continuous ring spaced outwardly from said first ring, and friction material secured to said cooperating sections.

10. In a clutch plate construction, a central hub, an annular ring carried thereby, a plurality of L-shaped sections of less thickness than said ring secured to said ring, said L-sections cooperating with each other to form a relatively continuous ring of annular wave formation spaced outwardly from said first ring, and friction material secured to said cooperating sections.

11. In a clutch plate construction, a central hub, an annular ring carried thereby, a plurality of L-shaped sections of less thickness than said ring secured to said ring, said L-sections cooperating with each other to form a relatively continuous ring of annular wave formation spaced outwardly from said first ring, and friction material conforming in shape to said wave formation and secured to said cooperating sections.

12. In a clutch plate construction, a central hub, an annular ring carried thereby, a plurality of spring sections of less thickness than said ring secured to said ring and cooperating with each other to form a relatively continuous ring radially located beyond said first ring, each of said spring sections formed with wave portions of a peripheral length extending over more than half the outer peripheral exposed edge of said respective section and said sections being capable of being flattened under axial thrust, and friction material secured to said spring sections.

13. A friction clutch element comprising a hub, a relatively sturdy mounting member mounted thereon and projecting radially therefrom, a plurality of structurally independent yieldable cushions having a substantially lesser weight per unit area than that of said mounting member, occupying an annular region lying beyond the outer radial limit of said mounting member and each having an integral reduced neck portion securely attached to said mounting member, and axially spaced friction facings carried by said cushions, said cushions being disposed between and in yielding engagement with said facings and being permanently deformed axially so as to normally maintain said facings in spaced parallel relationship and to allow compression thereof under packing pressure.

14. A friction clutch comprising a substantially circular disc of relatively heavy non-yielding sheet material, a hub on which said disc is mounted, a plurality of yieldable sheet metal cushions having a materially smaller weight per unit area than that of said disc, arranged in annular array beyond the periphery of said disc, and each having an attaching portion secured to said disc and a cushioning portion extending radially beyond the periphery of the disc, and substantially rigid friction facings embracing and carried by said cushioning portions, said cushioning portions being circumferentially bowed so as to maintain said friction facings in spaced planes parallel to the general plane of the plate and to allow said facings to be compresesd toward each other under clutch packing pressure.

15. A friction clutch driven plate comprising a relatively thick non-yielding sheet metal mounting disc, a plurality of structurally independent spring sheet metal cushion members of materially lesser thickness than said disc, including attaching portions secured to said disc and circumferentially enlarged axially distorted cushioning portions occupying an annular region lying beyond the periphery of the disc, and friction facings embracing and mounted upon said cushioning portions.

16. A friction clutch plate comprising a relatively thick heavy non-yielding sheet metal mounting disc having a radius more than half the total radius of the plate, a plurality of structurally independent spring metal cushion members of materially lesser thickness than said disc, including attaching portions secured to said disc near the periphery thereof and axially distorted cushioning portions occupying an annular region lying beyond the periphery of the disc, and friction facings embracing and mounted upon said cushioning portions.

17. In a friction clutch plate, a hub, a mounting disc mounted on said hub, comprising a substantially circular central disc portion of sheet metal of such thickness as to be substantially unyielding and to adequately withstand the torque loads imposed upon it during clutch operation, and a peripheral region having a low rotational inertia, said peripheral region comprising a plurality of yieldable cushion members of materially lesser thickness and weight per unit area than said disc portion, spaced from the periphery of said disc portion, neck members, of reduced circumferential width compared to that of said cushion members, joining said cushion members to the disc portion, and friction facings embracing and secured to opposite sides of said cushion members.

18. In a clutch plate construction, a central hub, an annular ring carried thereby, a plurality of angularly formed sections of materially less thickness and weight per unit area than said ring and secured to said ring, said sections cooperating with each other to form a relatively continuous ring spaced outwardly from said first ring, and friction material secured to said cooperating sections.

19. In a clutch construction, a driven plate assembly comprising a hub, an intermediate member carried thereby, a series of cushion members carried by said intermediate member and extending outwardly therefrom in a generally radially flaring form, said cushion members formed of spring stock materially thinner than said intermediate member so as to minimize rotational inertia, and unsupported portions of said cushion members cooperating to form a relatively continuous ring of wave formation susceptible of complete flattening while retaining its resilient characteristics.

20. In a clutch plate construction, a central hub, an annular ring carried thereby, a plurality of spring sections of materially less thickness and weight per unit area than said ring secured to said ring and cooperating with each other to form a relatively continuous ring radially located beyond said first ring, each of said spring sections formed with wave portions of a peripheral length extending over more than half the outer peripheral exposed edge of said respective section and said sections being capable of being flattened under axial thrust, and friction material secured to said spring sections.

21. In a clutch plate construction, a central hub, an annular ring carried thereby, a plurality of substantially L-shaped sections of materially less thickness and weight per unit area than said ring secured to said ring, said L-sections cooperating with each other to form a relatively continuous ring spaced outwardly from said first ring, and friction material secured to said cooperating sections.

22. In a friction clutch driven plate, a substantially circular central disc portion having a radius more than half but substantially less than the total radius of the driven plate, said central disc portion being of sheet metal of such thickness as to be substantially unyielding under the torque loads imposed upon it during clutch operation, and a peripheral region outwardly of said disc portion having a low rotational inertia, said peripheral region comprising a plurality of structurally separate spring steel cushion members of materially lesser thickness and weight per unit area than said disc portion, said cushion members occupying an annular region the inner extremity of which lies radially beyond but relatively near the periphery of said disc portion, inwardly extending neck portions on the cushion members of materially reduced circumferential width compared to the cushion members, said neck portions being integral with said cushion members and being riveted adjacent their inner edges to said disc portion, and a pair of axially separated annular friction facings occupying said peripheral region at opposite sides of said cushion members and riveted to each of said cushion members outwardly of the reduced neck portions thereof, with the rivet connections between each facing and the cushion members spaced circumferentially with respect to the rivet connections between the other facing and the cushion members, said cushion members being characterized by circumferentially extending wing portions which are arranged with their inner edges outwardly of the periphery of said disc portion and which are gradually curved along generally radial bend lines to provide circumferentially spaced contact portions in engagement with the backs of the facings, said cushion members being less than half as thick as the disc portion to which the reduced neck portions of the cushion members are attached, and said reduced neck portions being less than half as wide as the cushion members measured circumferentially in the zone of the wing portions.

23. In a friction clutch driven plate of the axially yieldable spring cushion type, a central disc structure having a radius more than half but substantially less than the total radius of the driven plate, said central disc structure being of sheet metal of such thickness as to be substantially unyielding under the torque loads imposed upon it during clutch operation, and a relatively light weight peripheral region outwardly of said disc structure having a low rotational inertia, said peripheral region comprising a plurality of spring steel cushions which are structurally separate from said disc structure and are of materially lesser thickness and weight per unit area than said disc structure, said cushions occupying an annular region the inner extremity of which lies radially beyond but relatively near the periphery of said disc structure, inwardly extending neck portions on the cushions of materially reduced circumferential width compared to the cushions, said neck portions being integral with said cushions and being rigidly secured adjacent their inner edges to said disc structure, and a pair of axially separated annular friction facings occupying said peripheral region at opposite sides of said cushions and secured to each of said cushions outwardly of the reduced neck portions thereof, said cushions being undulated axially along generally radial bend lines to form circumferentially spaced facing contact portions in axially separated planes for resiliently yieldable engagement with the backs of the facings, said cushions including circumferentially extending wing portions at the sides of the neck portions, which wing portions are arranged with their curved inner edges spaced outwardly from the periphery of said disc structure, said cushions being less than half as thick as the disc structure to which the reduced neck portions of the cushions are attached, and said reduced neck portions being less than half as wide as the cushions measured circumferentially in the zone of the wing portions.

JOHN F. DAUKUS.